(12) United States Patent
Winter et al.

(10) Patent No.: US 8,561,039 B2
(45) Date of Patent: Oct. 15, 2013

(54) METHOD FOR GENERATING A SET OF MACHINE-INTERPRETABLE INSTRUCTIONS FOR PRESENTING MEDIA CONTENT TO A USER

(75) Inventors: Marco Winter, Hannover (DE); Dirk Gandolph, Ronnenberg (DE); Jobst Hoerentrup, Wennigsen (DE); Ralf Ostermann, Hannover (DE); Andrej Schewzow, Hannover (DE)

(73) Assignee: Thomson Licensing, Boulogne, Billancourt (FR)

( * ) Notice: Subject to any disclaimer, the term of this patent is extended or adjusted under 35 U.S.C. 154(b) by 1274 days.

(21) Appl. No.: 12/082,744

(22) Filed: Apr. 14, 2008

(65) Prior Publication Data
US 2008/0275892 A1 Nov. 6, 2008

(30) Foreign Application Priority Data
May 4, 2007 (EP) .................................... 07107489

(51) Int. Cl.
*G06F 9/45* (2006.01)
*G06F 13/12* (2006.01)
*G09B 5/06* (2006.01)

(52) U.S. Cl.
USPC ............................ 717/145; 719/310; 715/716

(58) Field of Classification Search
USPC ......... 717/140, 151, 152, 153, 154, 155, 156, 717/157, 158, 159, 160
See application file for complete search history.

(56) References Cited

U.S. PATENT DOCUMENTS

| | | | | |
|---|---|---|---|---|
| 4,146,778 A | * | 3/1979 | Wain | 377/13 |
| 4,514,548 A | * | 4/1985 | Holubka | 525/528 |
| 4,636,999 A | * | 1/1987 | Lygas | 367/156 |
| 4,686,655 A | * | 8/1987 | Hyatt | 367/59 |
| 4,777,133 A | * | 10/1988 | Picciolo et al. | 435/7.22 |
| 6,735,601 B1 | * | 5/2004 | Subrahmanyam | 707/999.2 |
| 7,065,752 B2 | | 6/2006 | Willard | |
| 7,155,702 B2 | * | 12/2006 | Krishna et al. | 717/108 |
| 7,222,336 B2 | | 5/2007 | Willis | |
| 7,813,822 B1 | * | 10/2010 | Hoffberg | 700/94 |
| 8,218,951 B2 | | 7/2012 | Kim et al. | |
| 2001/0056504 A1 | * | 12/2001 | Kuznetsov | 709/310 |
| 2002/0169817 A1 | * | 11/2002 | Eves et al. | 709/201 |

(Continued)

FOREIGN PATENT DOCUMENTS

| JP | 2000089965 | | 3/2000 |
|---|---|---|---|
| JP | 2002140189 | * | 5/2002 |

(Continued)

*Primary Examiner* — Don Wong
*Assistant Examiner* — Mohammad Kabir
(74) *Attorney, Agent, or Firm* — Jeffrey D. Carter

(57) ABSTRACT

The invention addresses the objective of optimizing performance of a media data carrier interpreting device. This is achieved by a media data carrier interpreting device which comprises means for transforming a machine- interpretable instruction comprised in a media data carrier into a machine-executable code during media content presentation. Said media data carrier comprises a set of machine-interpretable instructions generated according to a method which comprises the steps of generating a first auxiliary set of instructions corresponding to a set of elements wherein the elements are conform with a template and compiling said first auxiliary instruction set. Then, said compiled first auxiliary instruction set is linked with a compiled second auxiliary instruction set corresponding to said template. This method removes the need for runtime parsing and therefore frees processing capacity for runtime transformation of the machine-interpretable instructions into machine-executable code.

10 Claims, 3 Drawing Sheets

(56) References Cited

U.S. PATENT DOCUMENTS

| | | | |
|---|---|---|---|
| 2004/0140997 A1* | 7/2004 | Gravina et al. | 345/716 |
| 2004/0143822 A1* | 7/2004 | Jager et al. | 717/140 |
| 2004/0158830 A1 | 8/2004 | Chung et al. | |
| 2005/0055677 A1 | 3/2005 | Nanja et al. | |
| 2005/0132327 A1* | 6/2005 | Mountain | 717/106 |
| 2005/0235272 A1* | 10/2005 | Skinner | 717/136 |
| 2006/0070044 A1* | 3/2006 | Romanovski et al. | 717/136 |
| 2007/0016703 A1 | 1/2007 | Bozionek et al. | |
| 2007/0061790 A1* | 3/2007 | Kay et al. | 717/145 |
| 2007/0079357 A1* | 4/2007 | Grinstein | 726/2 |
| 2007/0079384 A1* | 4/2007 | Grinstein | 726/27 |
| 2007/0112782 A1* | 5/2007 | Lobach et al. | 707/999.01 |
| 2009/0048978 A1* | 2/2009 | Ginter et al. | 705/51 |
| 2009/0089045 A1* | 4/2009 | Lenat et al. | 704/9 |
| 2009/0210347 A1* | 8/2009 | Sarcanin | 705/67 |
| 2009/0318228 A1* | 12/2009 | Hughes | 463/36 |
| 2010/0005527 A1 | 1/2010 | Jeon | |
| 2010/0243736 A1* | 9/2010 | Chou et al. | 235/385 |

FOREIGN PATENT DOCUMENTS

| | | | |
|---|---|---|---|
| JP | 200207596 | * | 7/2002 |
| JP | 2005505849 | | 2/2005 |
| JP | 2004528626 | | 9/2005 |
| JP | 2006509300 | | 3/2006 |
| JP | 2007513538 | | 5/2007 |
| JP | 2008527564 | | 7/2008 |
| WO | WO 2005/043377 A | | 5/2005 |
| WO | WO2005043377 | | 5/2005 |
| WO | WO2006075872 | | 7/2006 |

* cited by examiner

METHOD FOR GENERATING A SET OF MACHINE-INTERPRETABLE INSTRUCTIONS FOR PRESENTING MEDIA CONTENT TO A USER

This application claims the benefit, under 35 U.S.C. §119, of European Patent Application No. 07107489.2 of 4 May 2007.

BACKGROUND

The invention is related to generating a set of machine-interpretable instructions for storage in a data carrier. Upon interpretation of the machine-interpretable instructions by a data carrier interpreting device media content comprised in said data carrier is presented to a user.

Such machine-interpretable instructions are used within the context of interactive presentation of multimedia content stored on optical discs. For instance, upon interpretation of such instructions a user may be allowed accessing background information related to the actors and the director of a movie, viewing different versions of the movie or varying the plot of a movie. Integrating machine-interpretable instructions for content presentation onto the optical disc and making the execution of said instructions a prerequisite for accessing the multimedia content also allows for better control of access to the content. That is, such instructions may make access dependent on a password.

Due to the complexity of interactions, the machine-interpretable instructions are commonly derived from source code written in a high level language like C++, C# or JAVA.

Though being related to specific media content two different sets of machine-interpretable instructions still have many structures in common. Therefore, in practise only the most complex features for presenting multimedia are written in high level language source code. Initialization and configuration of features for presentation of certain media content is then achieved by help of a list of elements with associated attributes. Commonly, the list is comprised in a markup-file or a script-file wherein said file is further comprised in the media data carrier.

Then, parsing the markup-file is required when presenting the media content in the media data carrier. This is a burden for the limited processing power of common disc players.

The limited processing power of disc players establishes a need for optimization.

INVENTION

The invention addresses the objective of optimizing performance of a media data carrier interpreting device.

This is achieved by a media data carrier interpreting device comprising the features of claim 9 in conjunction with a media data carrier according to claim 10.

Said media data carrier comprises a set of machine-interpretable instructions generated according to a method with the features of claim 1.

Said method comprises the steps of generating a first auxiliary set of instructions corresponding to a set of elements wherein the elements are conform with a template and compiling said first auxiliary instruction set. Said method further comprises generating the set of machine-interpretable instructions by linking said compiled first auxiliary instruction set with a compiled second auxiliary instruction set. The compiled second auxiliary instruction set corresponds to said template.

Generating instructions for media presentations according this method allows integration of the information comprised in said elements into said machine-interpretable instructions before runtime. This removes the necessity of a parser and—step by step—the necessity of an interpreter as runtime transformation of the machine-interpretable instructions into machine-executable code is performed by transforming means comprised in the inventive media data carrier interpreting device.

In a preferred embodiment the template comprises at least one element definition structuring a way of media content presentation. Furthermore, the set of elements indicates at least one way of media content presentation to be used for presenting media content to the user wherein the elements comprised in said set of elements comprise one or more attributes for configuration of the indicated ways of media content presentation. This structure of template for an element set eases initialization and configuration of media content presentation.

Preferably the set of machine-interpretable instructions comprises identifiers of elements and/or attributes and generating the set of machine-interpretable instructions comprises altering said identifiers. This obfuscates the set of machine-interpretable instructions which impedes illicit use.

It is further preferred that the compiled second auxiliary set of instructions comprises JAVA classes and generating said first auxiliary set of instructions comprises generating instantiations of said JAVA classes. Then, the machine-interpretable instruction set is a JAVA object code. JAVA is known to offer a high degree of compatibility.

In another preferred embodiment the template is an XML scheme and the set of elements is comprised in an XML document following said XML scheme. Then, generating said first auxiliary set of instructions comprises parsing said XML document according to the XML scheme and instantiating an XML document conform object tree.

Preferably, the machine-interpretable instructions comprise instructions for media content rendering and/or instructions for user interaction.

In yet another preferred embodiment the compiled second auxiliary set of instructions is generated by compiling and executing an additional set of instructions corresponding to said template. Upon execution of said additional set of instructions the second auxiliary set of instructions is generated. Compiling said second auxiliary set of instructions yields the compiled second auxiliary set of instructions. This allows generating a slim high level language representation of the template automatically and avoids error-prone generation of said slim high level language representation by hand coding.

The inventive method can be performed by an authoring device with the features of claim 8.

The invention is also related to a data carrier carrying machine-interpretable instructions generated according to any of the disclosed inventive methods.

The inventive data carrier enables runtime compilation of the machine-interpretable instructions by a media data carrier interpreting device with the features of claim 9.

Said media data carrier interpreting device comprises means for accessing a set of machine-interpretable instructions comprised in said media data carrier and means for presenting media content comprised in said media data carrier to a user by help of interpretation of the machine-interpretable instructions. Said media data carrier interpreting device further comprises means for transforming a machine-interpretable instruction into a machine-executable code during media content presentation.

A memory for storing machine-interpretable instructions and machine-executable instructions is also comprised. The means for presenting media content shift media content presentation from being performed by help of interpretation of the machine-interpretable instruction to being performed by help of execution of the respective machine-executable code.

The inventive media data carrier interpreting device uses processing power deliberated from the necessity to parse for just-in-time transformation. This optimizes the performance of the inventive media data carrier interpreting device.

Preferably the media data carrier interpreting device comprises a JIT-compiler.

DRAWINGS

Exemplary embodiments of the invention are illustrated in the drawings and are explained in more detail in the following description.

EXEMPLARY EMBODIMENTS

Figure 1:
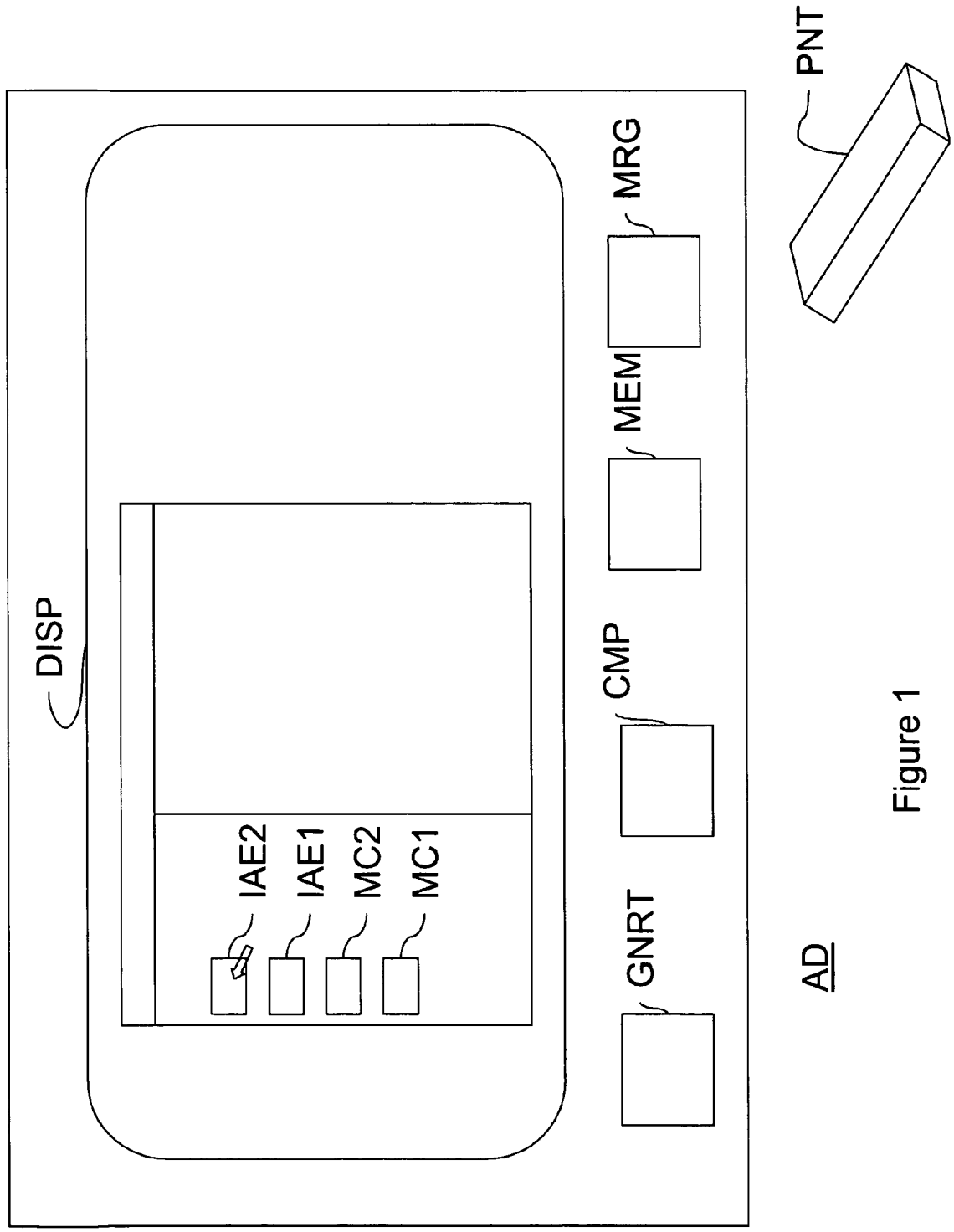
FIG. 1 depicts an exemplary authoring device which allows authoring of content of a multimedia optical disc.

FIG. 1 exemplarily shows an authoring device AD which allows authoring of content of a multimedia optical disc. The device AD comprises a screen DISP and a pointing device PNT, e.g. a mouse. Though not shown, the device may also comprise a keyboard for typing information. Furthermore, the exemplarily authoring device AD comprises a generator GNRT, a compiler CMP and a merger MRG. The screen DISP displays a graphical user interface comprising icons representing media data MC1, MC2 in a database and interaction elements IAE1, IAE2 in a library. By help of the pointing device a user can select a movie or other media data MC1, MC2 as well as buttons, frames and other interaction elements IAE1, IAE2 by clicking the respective icon. Furthermore, the user may compose by drag and drop the movie MC1, MC2 with the interaction elements IAE1, IAE2 for achieving an interactive menu. In a memory MEM, the device AD stores the user defined composition SSCE as a mark-up document, for instance in an XML-document, or in a script-document such as, for example, an iHD-document or a jscript-document.

Upon user demand the mark-up document SSCE is parsed and a first set of object orientated language instructions FIS is generated by the generator GNRT. Examples for object orientated languages used are C++, C# or JAVA. The generated first set of object orientated language instructions FIS comprises instantiations of objects. Then, the generated first set of object orientated language instructions FIS is compiled by the compiler CMP.

The compiled first set of instructions CFIS is linked by the merger MRG with a compiled second set of instructions CSIS. This yields a set of machine-interpretable instructions MIIS. Said compiled second set of instructions CSIS comprises the respective classes the objects are instantiations of. Compilation of both sets is performed in a way which obfuscates the instructions by altering identifiers and/or transforming data structures. Obfuscation may also include altering control structures by representing procedures inline, introducing irrelevant code and/or introducing object code which does not have any direct source code equivalent. Another way of obfuscation comprises introduction of redundant code or of code which causes common decompilers to exit with an error. Linking is optimized, in that only classes actually instantiated are linked.

Some-classes correspond to interactive elements such as buttons, switches, links, mouse events or controls. Other classes correspond to display areas, animations, frames, captions, time lines, media sources or the like.

The object code MIIS resulting from linking is ready to be stored on a blu-ray disc or another optical disc format together with media content like a movie or a video game which is presented upon interpretation of said object code MIIS.

Figure 2:
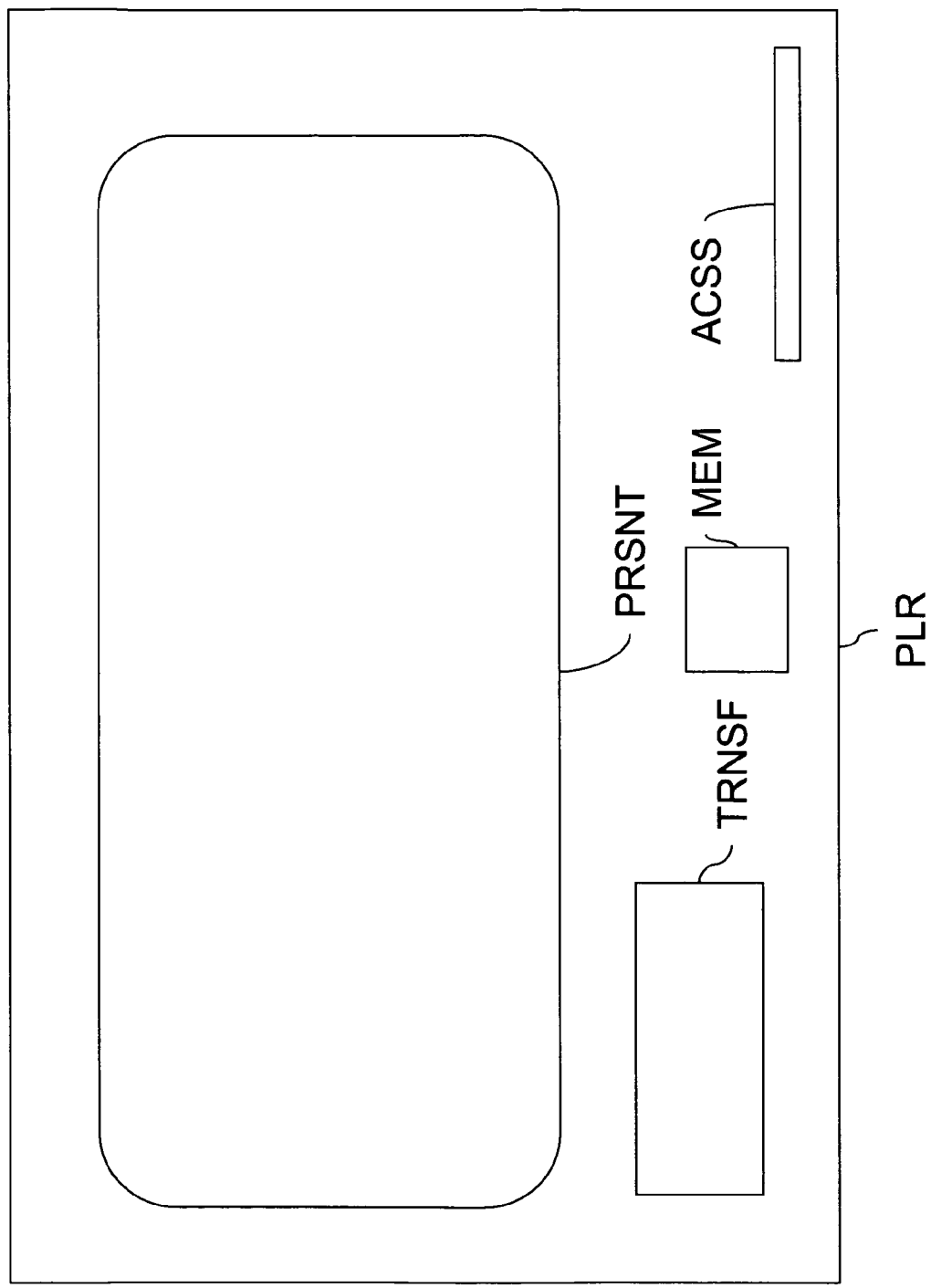
FIG. 2 depicts an exemplary media data carrier interpreting device.

When playing such a blu-ray disc in the player PLR depicted in FIG. 2 the object code MIIS is transformed into native code and already transformed structures are executed in parallel with further transformation of the object code MIIS. Through execution of the native code structures the media content is presented on a screen PRSNT. A memory MEM is managed wherein the memory MEM stores native code structures and allows reuse of such native code structures upon reappearance of respective structures in the object code MIIS. Native code is optimized according to the frequency of reappearance of the respective structures in object code MIIS.

For accessing the disc the player PLR comprises a reader ACSS. For transforming the machine-interpretable instructions MIIS into machine-executable code the player PLR further comprises a processor TRNSF. The processor TRNSF may also execute machine-executable code resulting from transformation.

In other exemplary embodiments the reader ACSS and the screen PRSNT are in separate devices interconnected by a possibly wireless network.

Figure 3:
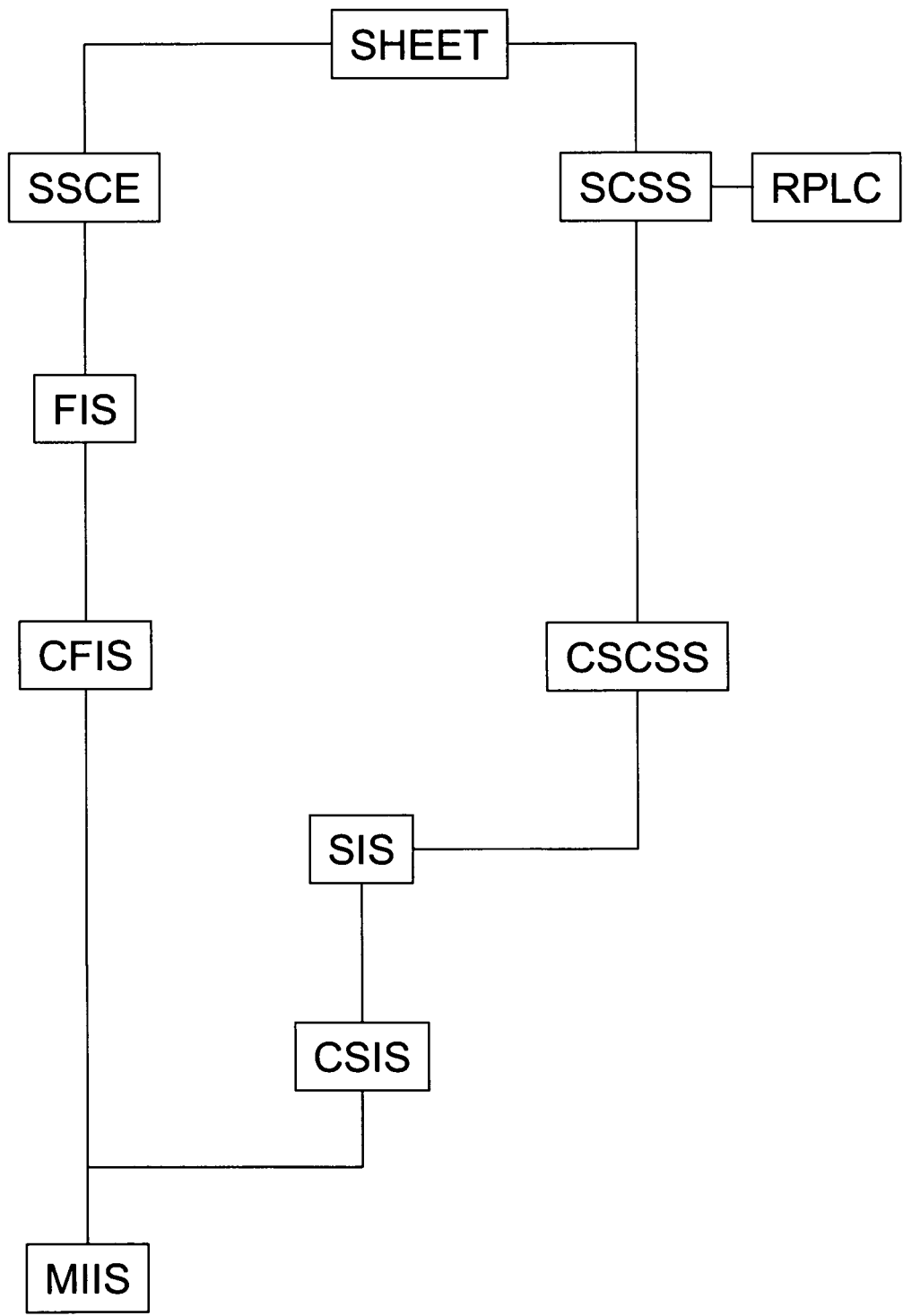
FIG. 3 depicts a chart of an exemplary embodiment of an content authoring method.

FIG. 3 exemplarily depicts the interrelationship of different codes during the authoring process. At the beginning different ways of media presentations are structured by element definitions in a style sheet SHEET. The element definitions are than translated into a high level language source code SCSS which also comprises a replica code RPLC. When executing the compiled high level language source code CSCSS, the replica code RPLC causes generation of a very slim high level language source code representation SIS of the element definitions. At this point, a user may add to elements their most complex or specific features. After that, the high level language source code representation SIS is compiled into compiled object code CSIS.

The compiled object code CSIS is a kind of library of different ways of media presentations. For a given media content a user may define one or more ways of media content presentation by forming a style sheet SHEET conform element list SSCE. Said element list SSCE instantiates ways of media content presentation and configures the ways via attributes comprised in said element list SSCE. The element list SSCE is translated into another high level language source code FIS which is subsequently compiled into another compiled object code CFIS. Finally, the other compiled object code CFIS is merged with selected objects from the compiled object code CSIS and a machine-interpretable instruction set MIIS is achieved. Only those objects of the object Code CSIS are selected for merging which correspond to definition of elements objects comprised in the other object code CFIS.

What is claimed is:

1. Method for generating a set of machine-interpretable instructions for storage in a data carrier wherein media content comprised in said data carrier is presented to a user upon execution of the machine-interpretable instructions by a data carrier interpreting device, said method comprises the steps of
- generating a first auxiliary set of instructions corresponding to a set of elements wherein the elements are conform with a template;
- compiling said first auxiliary instruction set and
- generating the set of machine-interpretable instructions by linking said compiled first auxiliary instruction set with a compiled second auxiliary instruction set corresponding to said template.

2. Method according to claim 1, further comprising
- the template (SHEET) comprises at least one element definition structuring a way of media content presentation and
- the set of element indicates at least one way of media content presentation to be used for presenting media content to the user wherein
- the elements comprised in said set of elements comprise one or more attributes for configuration of the indicated ways of media content presentation.

3. Method according to claim 1 wherein
- the set of machine-interpretable instructions comprises identifiers of elements and/or attributes and
- generating the set of machine-interpretable instructions comprises altering said identifiers.

4. Method according to claim 1 wherein
- the compiled second auxiliary set of instructions comprises JAVA classes and
- generating said first auxiliary set of instructions comprises generating instantiations of said JAVA classes;
- wherein the machine-interpretable instruction set is a JAVA object code.

5. Method according to claim 1 wherein
- the template is an XML scheme;
- the set of elements is comprised in an XML document following said XML scheme and
- generating said first auxiliary set of instructions comprises parsing said XML document according to the XML scheme and instantiating an XML document conform object tree.

6. Method according to claim 1 wherein
- the machine-interpretable instructions comprise instructions for media content rendering and instructions for user interaction.

7. Method according to claim 1 wherein the compiled second auxiliary instruction set is generated by
- compiling and executing an additional set of instructions corresponding to said template, wherein
- upon execution of said compiled additional set of instructions a second auxiliary instruction set is generated, and
- compiling the second auxiliary instruction set.

8. Authoring device for generating a set of machine-interpretable instructions for storage in a data carrier wherein media content comprised in said data carrier is presented to a user upon execution of the machine-interpretable instructions by a data carrier interpreting device, said authoring device comprising
- a generator for generating a first auxiliary set of instructions corresponding to a set of elements wherein the elements are conform with a template;
- a compiler for compiling said first auxiliary instruction set and
- a merger for generating the set of machine-interpretable instructions by linking said compiled first auxiliary instruction set with a compiled second auxiliary instruction set corresponding to said template.

9. Media data carrier interpreting device comprising
- means for accessing a set of machine-interpretable instructions comprised in said media data carrier;
- means for presenting media content comprised in said media data carrier to a user by help of executing machine-executable instructions and
- means for transforming a machine-interpretable instruction into a machine-executable instructions during media content presentation and
- a memory for storing machine-interpretable instructions and machine-executable instructions;
- wherein the means for presenting media content shift media content presentation from being performed by help of interpretation of the machine-interpretable instructions to being performed by help of execution of the respective machine-executable instructions.

10. Data carrier for media content, said data carrier comprising a machine-interpretable instruction set generated according to claim 1.

* * * * *